United States Patent [19]

Nemeh et al.

[11] Patent Number: 4,767,466

[45] Date of Patent: Aug. 30, 1988

[54] BULKING PIGMENTS

[75] Inventors: Saad Nemeh, West Long Branch; Richard A. Slepetys, Brick Township, Ocean County, both of N.J.

[73] Assignee: Engelhard Corporation, Menlo Park, N.J.

[21] Appl. No.: 908,439

[22] Filed: Sep. 16, 1986

[51] Int. Cl.⁴ .............................................. C04B 14/10
[52] U.S. Cl. ............................... 106/487; 106/287.17; 106/287.34
[58] Field of Search ......... 106/287.34, 308 M, 308 Q, 106/287.17, 291, 309

[56] References Cited

U.S. PATENT DOCUMENTS

| | | | |
|---|---|---|---|
| 3,804,656 | 4/1974 | Kaliski et al. | 106/308 |
| 3,994,806 | 11/1976 | Rausch et al. | 210/728 |
| 4,182,785 | 1/1980 | Price | 106/288 B |
| 4,186,027 | 1/1980 | Bell et al. | 427/361 |
| 4,548,733 | 10/1985 | Vincent | 252/310 |

FOREIGN PATENT DOCUMENTS 2736322  2/1979  Fed. Rep. of Germany.

OTHER PUBLICATIONS

Chemical Abstracts, vol. 90, No. 18, Apr. 1979, p. 69, Abstract No. 139135z.

*Primary Examiner*—Amelia Burgess Yarbrough
*Attorney, Agent, or Firm*—Inez L. Moselle

[57] ABSTRACT

A method for preparing a heat stable aqueous slurry of a bulking pigment suitable for use in coating or filling paper which comprises preparing a fluid aqueous suspension of particles of kaolin clay, adding thereto a water-soluble cationic polyelectrolyte, the amount of said cationic polyelectrolyte being sufficient to substantially thicken and flocculate said fluid suspension, acidifying the resulting flocculate clay suspension, bleaching the clay in said suspension with a hydrosulfite salt, filtering said acidified suspension to recover bulked clay, washing the filtered clay and adding minimal amounts of a sodium polyacrylate and a nonionic surfactant to the recovered bulked clay to provide a fluid suspension of bulked clay.

15 Claims, No Drawings

BULKING PIGMENTS

BACKGROUND OF THE INVENTION

This invention relates to improving the stability of slurries of bulking kaolin clay pigments when the slurries are exposed to elevated temperatures, for example when the slurries are prepared into coating colors in a steam jet cooker or shipped and stored under high ambient temperatures.

Finely divided refined kaolin clay is widely used as a pigment to provide a glossy, white opaque surface finish on printing paper. The clay is applied as an aqueous "coating color" which comprises a clay pigment, a dispersing agent for the clay, a suitable adhesive such as a polymer latex, starch, or mixtures thereof and other minor additives. Present-day coatings are applied at high machine speeds which necessitate the use of high solids coating colors. The formulation of coating colors at high solids requires the initial provision of fluid high solids clay-water suspensions or "slips". These suspensions are subsequently mixed with adhesive dispersions or suspensions to prepare the coating colors. High solids clay-water suspensions of hydrous (uncalcined) clays generally contain in excess of 65% clay solids (65 parts by weight dry clay to 35 parts by weight water). Typically, solids are about 70%. A dispersing (deflocculating) agent, conventionally a sodium condensed phosphate salt, or sodium polyacrylate, is present in the high solids suspensions in order to impart fluidity, since the systems do not flow in the absence of the dispersing agent.

Kaolin clay pigments must meet certain requirements with regard to rheological properties and to the properties of the coated sheet material. The visosity of the high solids suspension of the clay coating pigment must be sufficiently low to permit mixing and pumping. After the adhesive is incorporated, the resulting coating color must also have suitable viscosity for handling and application to the paper sheet. In addition, it is highly desirable to obtain a coated calendered sheet which has good opacity, gloss, brightness and printability.

It is the conventional practice in the art to improve the opacifying or hiding power of coating colors by blending the clay pigments with more costly pigments having greater opacifying power, such as $TiO_2$. The industry has long sought a kaolin clay pigment which imparts improved opacifying power to coated paper without sacrificing gloss and printability and which can preferably be used in the absence of other more expensive pigments.

High bulking clay pigments offer the opportunity of maintaining or improving the opacity, gloss and printability of coated paper incorporated at lower coating weights, thereby reducing the pigment cost for coating colors. Bulking pigments are those which provide coatings having high opacification at a low cost weight. Generally, bulking is achieved by introducing voids in a pigment structure which contribute to increase light scatter. Controlled calcination of kaolin clays results in one type of bulking clay pigment. U.S. Pat. Nos. 4,075,030; 4,076,548 and 4,078,941 teach increasing the opacifying power of hydrous kaolin clays by "selectively flocculating" ultrafine clay particles with a low molecular weight polyamine flocculating agent (e.g. ethylene diamine or hexamethylene diamine) or with long carbon chain amines or certain quaternary ammonium salts (e.g., "ditallowdimethyl" ammonium chloride) in the presence of a mineral acid flocculating agent, e.g., sulfuric acid, and optionally with the added presence of citric acid or mica or both. The selective flocculating treatment allegedly incorporates voids in the clay to form a low density, high bulking pigment which when used as a coating color pigment improves the opacity of paper coated therewith. These patents do not disclose the use of polymers not do they contain information regarding the ability to disperse the bulked clay to prepare clay-slurries having acceptable rheological characteristics for commercial use.

We are aware of the fact that efforts to exploit bulking pigments to the paper industry have been thwarted among other things by the poor rheology of the pigments. Generally, paper makers seek to use clay coating pigments capable of forming high solids clay-water slurries which have a low shear viscosity below 1000 cp, preferably below 500 cp when measured by the Brookfield viscometer at 20 rpm. High shear viscosity for these slurries should be such that they are no more viscous than a slurry having a Hercules endpoint viscosity of 500 rpm, preferably 800 rpm, using the "A" bob at $16 \times 10^5$ dyne-cm. Those skilled in the art are aware that when using the Hercules viscometer and measuring endpoints of 1100 rpm or higher, endpoint viscosities are reported in units of dyne-cm at 1100 rpm; apparent viscosity increases as the value for dyne-cm increases. It is conventional to use the abbreviated term "dyne". Thus, a "2 dyne" clay slurry is less viscous than a "9 dyne clay" slurry. As used hereinafter the expressions 500 rpm or higher, or 800 rpm or higher, are intended to include lower viscosities such that endpoint measurements are at 1100 rpm and the values are reported as dynes.

For reasons of economy, the manufacture of refined kaolin pigments usually necessitates sizing and purifying crude clay while the clay is in the form of a fluid deflocculated aqueous slurry, bleaching the clay while in a flocculated state, filtering the flocculated clay to remove liquid water and then dispersing the flocculated clay to form a high solids slurry that is sold as such or is dried, usually in a spray dryer, to provide a dry refined pigment capable of being mixed with water to form a dispersed fluid suspension. The latter form of clay is frequently referred to a "predispersed" grade of clay even though the clay is dry and is not present in dispersed state until it is mixed with water. Another problem encountered in the manufacture of bulking pigments from clay is to produce a bulked structure that is sufficiently durable to survive during various stages of production and end-use but is also capable of being dispersed to form high solids clay-water slurries having acceptable rheology. When the general wet processing scheme described above is employed to make bulked structures by adding a bulking agent before filtration, the bulked structure must still be present in the filter cake containing the bulked assemblages when the filter cake is "made down" into a fluid slurry. The expressions "make down" and "made down" are conventional in the industry and refer to the preparation of dispersed pigment-water slurries. In some cases, it may be necessary to apply mechanical work to the filter cake to reduce the low shear viscosity to usable values. The bulked structure must be sufficiently tenacious to survive the mechanical forces during such treatment. Bulking pigments must also be sufficiently stable under the influence of shear to maintain the bulked structure under the high shear rates encountered in pumping high solids clay water slurries. Moreover, a bulked structure must be capable of being retained when the deflocculated clay water slurry is formed into a coating color using standard makedown equipment. Also, the bulked structure must survive during the coating application and subsequent calendering. The fragility of the bulked structures obtained by chemical treatments of hydrous clays has limited their commercial use. Commercial bulking clays heretofore used by the paper industry are prepared by calcining fine particle size hydrous clays. In such case, calcination "sets" the bulked structure such that it is sufficiently durable to survive during manufacturing handling and use. Generally, a criterion for durability of a bulked structure is the retention of improved opacification (light scattering).

The present invention makes use of water-soluble cationic polyelectrolytes to produce bulked hydrous clay pigments having a unique combination of desirable properties. These cationic polyelectrolytes are high charge density materials and have the ability to flocculate clay-water slurries Cationic polyelectrolyte flocculants have been used in the past to clarify various suspensions such as river waters containing suspended fine solids, municipal waste and sewage sludge. The efficiency of such flocculants is frequently evaluated by measuring the ability of the flocculant to clarify clay suspensions. It is also known that various polymers including certain cationic polyelectrolytes will increase the rate at which suspensions of clay filter. However, the use of polymeric filter aids to increase filtration may adversely affect the rheology of kaolin clay intended for use as high performance pigments in the paper industry. Furthermore, filter cake solids are usually decreased when polymers are used as filter aids. As a result drying costs are increased. This may reduce the economic benefit of increased filtration rates. To the best of our knowledge, the quality segment of the clay industry devoted to producing high performance pigments and fillers does not utilize polymeric filter aids to produce clay pigments.

THE INVENTION

Copending patent application, Ser. No. 861,943, filed May 12, 1986 provides new relatively inexpensive kaolin pigments with a stable bulked structure but also capable of being mixed with water to form clay-water slurries and coating colors having useable low and high shear viscosity. The new bulked pigments, obtained using cationic polyelectrolytes to bulk the clay, can be applied to paper at low coat weights. Coated printing paper possessing superior printability, especially by rotogravue and offset methods is obtained. However, slurries of the bulked pigment tend to increase in viscosity when exposed to high temperature, for example when prepared into starch coating colors by the known steam jet cooking procedure. Similarly, viscosity may increase slowly upon exposure to elevated storage temperature (e.g. 100° F.), over a period of several weeks. It is an object of the present invention to provide slurries of bulked kaolin pigments which have improved stability at elevated temperatures.

The above and other objects are achieved in accordance with the present invention wherein slurries of bulked kaoling pigments are dispersed with a nonionic surfactant, preferably a combination of a nonionic surfactant and a polyacrylate salt dispersant, such as, for example, sodium polyacrylate.

DESCRIPTION OF PREFERRED EMBODIMENTS

The nonionic surfactants used in practice of the invention are compatible with water and oil and have an HLB value in the range of 3 to 18, preferably 5 to 14. Suitable nonionic surfactants fitting this description are well known to those skilled in the pigments, fillers (extenders) and coatings arts.

One type of nonionic surfactants useful in this invention include the nonylphenoxypoly(ethylenoxy) ethanol compounds having the average formula:

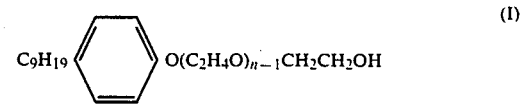
(I)

wherein n is a number of 4 to 12, preferably 7 to 9, and the compound has an HLB value of 3 to 18, preferably 5 to 14. Specific surfactants of this type are the Igepals made and sold by GAF Corp. of Charlotte, N.C., including igepal 610 having formula (I) given above in which n has an average value of about 7.82, and an HLB of 12.2, Igepal CO-210 having formula (I) wherein n has an average value of about 1.33 and an HLB of 4.6, Igepal CO-520 having formula (I) wherein n has an average value of about 5.4 and an HLB of 10.0, Igepal CO-720 having formula (I) wherein n has an average value of about 12.9 and an HLB of 14.2 and the like.

Another type of nonionic surfactants useful in this invention includes the condensates of ethylene oxide condensed with hydrophobic condensates formed by condensing propylene oxide and propylene glycol. This type of nonionic surfactant can be depicted by the average formula:

$$HO(C_2H_4O)_x(C_3H_6O)_y(C_2H_4O)_zH \quad (II)$$

in which x, y and z are numbers of such relative values to provide an HLB value in range of 3 to 18, preferably in the range of 5 to 14. Specific surfactants of this type include the Pluronics sold by BASF Wyandotte Industrial Chemical Group, specifically Pluronic L-72 having an HLB of 6.5, Pluronic L-31 having an HLB of 4.5, Pluronic L-64 having an HLB of 15 and the like. The Pluronics, however, may present an odor problem when clay products containing them are spray dried or when they are otherwise subjected to elevated temperatures and thus they are less preferred than the Igepals such as Igepal 610.

The preferred surfactant is of the decyloxy poly (ethylenoxy) ethanol type having the average formula $C_{10}H_{21}O(C_2H_4O)_nCH_2CH_2OH$, where n can range from 6 to 8. The HLB is preferably 12–14. This type of surfactant provided best viscosity stability at elevated temperatures.

The proportion of nonionic surfactant in the novel mixture of bulked clay, polyacrylate salt such as sodium polyacrylate, and surfactant is not narrowly critical and can range from 0.05% to 0.25% on dry clay basis and preferably 0.1% to 0.15%. The amount of polyacrylate can range from 0.05% to 0.3% on dry clay basis, and preferably 0.1% to 0.175%.

Other examples of nonionic surfactants having an appropriate HLB value falling within the above-described ranges can be found by reference to standard publications such as McCutcheon's 1982: Combined Edition, published by McCutcheon's Division MC Publishing Company, 175 Rock Road, Glen Rock, N.J. 07452, or earlier editions such as McCutcheon's: Detergents and Emulsifiers, published by Allured Publishing Company, Ridgewood, N.J., 1974. In addition, trade publications such as "Technical Data on Pluronic Polyols", OS 796, published by BASF Wyandotte Corporation, Organic Specialties & Fine Chemicals Dept., Parsippany, N.J. 07054, or "Igepal CA Nonionic Surfactants, a Homologous Series of Octylphenoxy Poly (ethyleneoxy) Ethanols" #2303-020, published by GAF Corporation, 1361 Alps Road, Wayne N.J. 07470, can be consulted for further examples of nonionic surfactants usable in this invention.

The bulked kaolin clay used in the novel mixtures of this invention are preferably those bulked by addition of cationic polyelectrolytes as described in copending application, Ser. No. 861,943, filed May 12, 1986.

Preparation of Preferred Bulked Pigments (Ser. No. 861,943)

It has been determined that the shape of the particle size distribution curve of the kaolin clay used to produce pigments of the invention has an effect on the ultimate coating properties of the polyelectrolyte treated kaolin clay mineral. Thus, a clay having the following particle size distribution characteristics has been found to provide optimum rheology and coating properties: a median particle size of 0.55 micrometers and a particle size distribution such that about 88±2% of the particles have an equivalent spherical diameter less than about 2 micrometers and not more than about 25% by weight, preferably not more than about 20% by weight, have an equivalent spherical diameter less than 0.3 micrometers. If the particle size is too coarse, gloss and opacity suffer although opacity will be greater than the clay before treatment with polyelectrolyte. If the quantity of ultrafine particles, i.e., particles 0.3 micrometers and finer, is too great, the rheology of the pigment may be such that it has limited, if any, use.

In order to achieve the desired particle size distribution of the kaolin that is eventually formed into a bulked structure, it is generally necessary to perform one or more particle size separations on the crude clay. Generally, such processing includes degritting, followed by differential gravitational or centrifugal sedimentation to recover a size fraction of desired particle size, such as for example, a fraction that is 90% by weight finer than 2 micrometers and does not contain an excessive amount of ultrafine particles. The content of ultrafines and median (weight) particle size of such fraction will vary, depending on the particle size distribution of the crude clay. In order to perform these operations successfully, it is essential that the clay be present in the form of discrete particles in water rather than flocs so that the particles can be accurately separated into different size ranges. The clay particles are therefore treated with a deflocculant (dispersing agent) which will give all the particles a negative electric charge, and cause them to repel each other when the particles are suspended in water. The clay dispersant used at this stage is generally referred to as a "primary" dispersant. Dispersants used to deflocculate suspensions of previously processed clay (such as dispersants added to filter cakes) are termed "secondary" dispersants or deflocculants. Suitable dispersing agents used for primary dispersion in practice of the present are conventional and include water soluble salts of a condensed phosphate, such as a pyrophosphate, e.g., tetrasodium pyrophosphate, (TSPP), a water soluble salt of a polysilicic acid, for example, sodium silicate, or a water soluble organic polymeric dispersing agent, for example a polyacrylate or a polymethylmethacrylate salt having a molecular weight in the range of about 500 to about 10,000. The amount of dispersing agent used will generally be in the range of from about 0.025 to 0.2% by weight based on the weight of the dry clay. Generally, particle size separations are performed using deflocculated aqueous suspensions having a solids content of about 20-40% by weight. Other solids levels may be used to carry out such separations. The median particle size of the clay particles that are treated with the cationic polyelectrolyte should range from 0.4 to 0.7 micrometers, equivalent spherical diameter (e.s.d.), preferably 0.5 to 0.6 micrometers, as determined by conventional sedimentation techniques using the SEDIGRAPH® particle size analyzer, supplied by Micromeretics, Inc. From about 80% to 95% by weight of the particles should be finer than 2 micrometers, e.s.d. The content of fines below 0.3 micrometer e.s.d. should be below 35 weight percent, preferably below 25 weight percent, and most preferably 20 weight percent or below. It should be understood that the measurements of the size of clay particles that are 0.3 micrometer or finer are of limited reproducibility. Thus, when a SEDIGRAPH analyzer is employed, the value for weight percent may be ±5% when tested by another operator or a different SEDIGRAPH analyzer is employed. Most preferably, median particle size is 0.6±0.05 micrometers, e.s.d., with 85 to 90% by weight of the particles finer than 2 micrometers, e.s.d., and less than about 20% by weight or less finer than 0.30 micrometers, e.s.d. Present experience, indicates that when the clay to which polyelectrolyte is added contains an excessive amount of ultrafine particles (particles 0.3 micrometers or finer), the Brookfield viscosity may be higher than and Hercules viscosity lower than bulked pigments obtained from clays with a smaller amount of ultrafine particle. One trial resulted in a failure because of excessively high low shear viscosity of the product when the feed clay contained more than the desired amount of particles finer than 0.3 micrometers. Blending of clay fractions may be advantageous or necessary with some crudes to provide a clay feed having a desirable particle size distribution.

The amount of polyelectrolyte employed is carefully controlled to be sufficient to improve the opacity of the clay as a result of forming a bulked (aggregated) structure in which the aggregates are sufficiently strong to survive mechanical forces exerted during manufacture and end use but is carefully limited so as to assure that the product can be formed into a clay-water slurry that has a solids content of 60% or higher, which slurry has acceptable rheology.

The amount of the cationic polyelectrolyte salt used to treat the kaolin clay may vary with characteristics of the polyelectrolyte including charge density of the polyelectrolyte, the particle size distribution of the clay and solids content of the clay slurry to which the polyelectrolyte is added. Using the presently preferred dimethyldiallyl ammonium salt polyelectrolyte with clay having a medium size in the range of about 0.5 to 0.6 micrometers, and having less than 20% finer than 0.3 micrometers and adding polyelectrolyte to a previously deflocculated clay-water suspension having a clay solids content of about 20-40% by weight, useful amounts range from about 0.03 to about 0.15% by weight of the moisture free weight of the clay, most preferably about 0.07 to about 0.1% by weight. When insufficient polyelectrolyte is used, the effect on opacity and printability in coating applications may be less than desired. On the other hand, an excesive amount of the polyelectrolyte may impair other desired properties of the clay, especially rheology.

The polyelectrolyte, which is water soluble, is added to the slurry as a dilute aqueous solution, e.g. ¼–2% concentration on a weight basis, with agitation to achieve good distribution in the slurry. Ambient temperature can be used. It may be advantageous to heat the slurry of clay, solution of polyelectrolyte, or both to about 150° to 180° F. The cationic polyelectrolyte flocculants that are used have closely spaced charged centers and therefore represent high charge density material. Because of this, the reaction with the clay mineral is extremely rapid and appears to be complete in a relatively short time. While we do not wish to be limited by any particulars of the reaction mechanisms, we believe that the clay mineral cations such as $H^+$, $Na^+$, and $Ca^{++}$ are replaced with the positively charged polymeric portion of the cationic polyelectrolyte at the original mineral cation location and that this replacement reduces the negative charge on the clay particles which in turn leads to coalescence by mutual attraction. Charge centers near the end of the polymer chain react and bridge with neighboring particles until the accessible clay cation exchange centers or the polymer charge centers are exhausted. The bridging strengthens the bond between the particles, thereby providing a highly shear resistant, bulked clay mineral composition. The presence of chloride ions in the filtrate in the case of dimethyldiallyl ammonium chloride may be an indication that at least one stage of the reaction between clay particles and quaternary salt polymer occurs by an ion-exchange mechanism. The amount of polyelectrolyte added is less than that calculated to provide a monolayer on the surface of clay particles.

Water soluble cationic polyelectrolyte flocculants are well known in the art and many are known to increase the rate at which clay slurries filter. See, for example, U.S. Pat. No. 4,174,279. Cationic polyelectrolyte flocculants are characterized by a high density of positive charge. (Positive charge density is calculated by dividing the total number of positive charges per molecule by the molecular weight.) Generally the high charge density of polyelectrolyte flocculants exceeds $1 \times 10^{-3}$ and such materials do not contain negative groups such as carboxyl or carbonyl groups. In addition to the alkyldiallyl quaternary ammonium salts, other quaternary ammonium cationic flocculants are obtained by copolymerizing aliphatic secondary amines with epichlorohydrin. See U.S. Pat. No. 4,174,279. Still other water-soluble cationic polyelectrolyte are poly (quaternary ammonium) polyether salts that contain quaternary nitrogen in polymeric backbone and are chain extended by either groups. They are prepared from water-soluble poly (quaternary ammonium salts) containing pendant hydroxyl groups and bifunctionally reactive chain extending agents; such polyelectrolytes are prepared by treating an N,N,N$^{(1)}$,N$^{(1)}$ tetraalkylhydroxyalkylenediamine and an organic dihalide such as dihydroalkane or a dihaloether with an epoxy haloalkane. Such polyelectrolytes and their use in flocculating clay are disclosed in U.S. Pat. No. 3,663,461. Other water-soluble cationic polyelectrolyte flocculants are polyamines. Polyamine flocculants are usually supplied commercially under trade designations and chemical structure and molecular weight are not provided by the suppliers.

A dimethyl diallyl quaternay ammonium chloride polymer commercially available under the trademark designation Polymer 261 LV from the Calgon Corporation having a molecular weight estimated to be between 50,000–250,000 has been found particularly useful in the practice of the present invention and has FDA approval (Code 176-170) for use in paper and board that comes in contact with aqueous and fatty foods. Many reagents heretofore proposed to bulk clay do not have FDA approval. However, the invention is not limited to Polymer 261 LV since other cationic flocculants appear to provide equivalent, if not superior results.

Limited experimental work with kaolin clay that produced desired results using 0.08% Calgon 261 LV polymer (dimethyl dially ammonium chloride, said by the supplier to have a molecular weight between 50,000 and 250,000) indicates that similar results would be expected with water-soluble cationic flocculants supplied with the following trademarks when used in the quantities indicated (100% active weight basis): NALCOLYTE® 7107 (0.25%), NALCLEAR® 7122 (1.00%), NALCOLYTE® 8102, (0.50%), NALCOLYTE® 8101 (1.0%), NALCOLYTE® 8100 (1.0%). Information from the suppliers indicates that these polyelectrolytes are:

NALCLEAR 7122-water/oil emulsion of aminomethylated polyacrylamide quaternary, low molecular weight.

NALCOLYTE 8101-Aqueous solution of polyquaternaryamine chloride, moderate molecular weight.

NACOLYTE 7107-aqueous solution of polyamine, low molecular weight.

NALCOLYTE 8100-aqueous solution of quaternary polyamine, moderate molecular weight.

The exact structural formula of the preferred diallyl polymers has not been completely delineated. It is believed that either of the two ring structures set forth below could represent the structure.

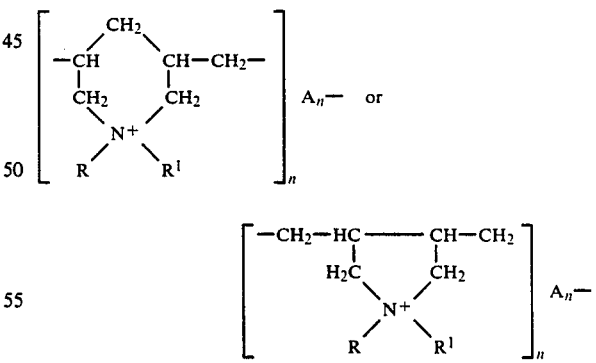

wherein: R and $R_1$ are selected for hydrogen or an alkyl group of 1 to 18 carbon atoms, n indicates repeating units, and $A^-$ is an anion such as $Cl^-$. The preferred compounds are dialkyl diallyl quaternary ammonium salt polymers which contain alkyl groups R and $R_1$ of 1 to 4 carbon atoms, preferably methyl, and n is an integer of 5 to 1000. Such polyelectrolytes are known flocculating agents. For example, U.S. Pat. No. 3,944,806 and U.S. Pat. No. 4,450,092 disclose the use of dimethyl diallyl ammonium chloride salt polymers in combination with aluminum and iron salts or a polyacrylamide in coagulating finely divided solids in turbid waters. It should be understood that incorporation of other anions in place of chloride ion is possible, although performance could be affected. Examples of such other anions are acetate, sulfate, nitrate and hydroxide.

Satisfactory results have been realized when the polyelectrolyte was added to deflocculated clay suspensions having pH values in the range of 6 to 9. After addition of polyelectrolyte, the suspension is substantially thickened as a result of flocculation. The resulting thickened system is then acidified, typically to a pH below 5, usually pH 3-4, and bleached using a conventional clay bleach (hydrosulfite salt such as sodium hydrosulfite) and then at least partially dewatered to remove free water and place the recovered bulked clay in a form such that it can be washed to remove ions in the flocculated clay suspension. Normally dewatering is carried out on a filter, for example a rotary vacuum filter.

Bleaches are usually reductants which reduce any color forming ferric iron ($Fe^{3+}$) constituents to a more water soluble and therefore more easily removeable ferrous state ($Fe^{2+}$). Suitable bleaching agents include water soluble hydrosulfite salts, and borohydride salts which are advantageously added to the clay mineral slurry in an amount in the range of from 1 to 15 lb., most preferably about 2 to 6 lbs., of bleaching agent per ton of dry clay. The slurry of polymer treated clay is acidified before filtration in order to enhance filtration even if bleaching is not carried out.

The clay suspension is dewatered by filtering to a moist filter cake having a solids content of between about 50 to about 60% by weight. The filter cake is then washed to remove soluble material and then fluidized by the addition of a secondary dispersing agent, such as tetrasodium pyrophosphate to the filter cake at a concentration of about 0.01 to about 1.0 percent by weight based on the dry clay solids and preferably about 0.05 to about 0.15 percent by weight. Polyacrylate salts are preferably used to fluidize the filtercake although mixtures thereof with condensed phosphate salt or a condensed phosphate salt alone may be used. The pH is usually kept between 6.0 and 7.5.

The presence of the polyelectrolyte significantly improves the rate of dewatering that can be achieved with conventional filtration equipment (e.g., a rotary vacuum filter) during the processing of the pigment. Thus, the presence of polyelectrolyte during filtration decreases filtration costs, and the increased filtration rate compensates in part for the cost of the cationic polyelectrolyte. It should be noted that the amount of polyelectrolyte used in practice of the present invention is not selected to maximize settling or filtration rates since in practice of the invention the bulked structure must be capable of being formed to clay-water system having useable viscosity after addition of a suitable quantity of deflocculating agent. In some cases, it will be necessary during manufacture to apply mechanical work to the bulked clay in the filter cake while adding a deflocculating agent in order to obtain a desired low viscosity. Filter cake solids vary with the equipment used and the level of vacuum applied. Solids also vary with the particle size characteristic of the clay. Generally, addition of polyelectrolyte flocculant usually decreases the solids content of the filter cake. The filter cake is washed with water to remove soluble matter. It has been found that use of hot water, e.g., water having a temperature above 100° F. and below the boiling point is beneficial. Use of hot wash has resulted in products having a lower Brookfield viscosity than was obtained when wash water was at ambient temperature. The use of a hot wash results in filter cakes having a reduced content of salts. For example, filter cakes having specific resistances ranging from about 13,000 to 50,000 ohm-cm resulted from washes at 120°-140° F. while unheated water in similar amount resulted in cakes having specific resistances of about 6000 ohm-cm. It has also been found that slurries prepared by adding dispersant to conventionally washed (cold water) filter cakes should be spray dried without aging the slurries for more than one or two days because high and low shear viscosity of spray dried pigments are adversely affected. When a hot wash is used, slurries can be aged for longer times, e.g., two weeks or longer without detriment to the rheology of the pigment. By using a hot wash, pigments can be shipped in slurry form without an intermediate drying step. This benefit is of significant economic benefit.

In some cases, it is necessary to increase the solids of the filter cake to realize the desired reduction in Brookfield viscosity of the product, especially when the work input during blunging is low. For example, in the case of one bulked clay which produced a filter cake having solids content of 55%, the desired reduction in viscosity necessitated addition of dry clay to build up to a solid content of 59% prior to spray drying before the mechanical work was effective.

The dewatered and washed filter cake may be fluidized by adding a deflocculant and supplied for shipment in slurry form as mentioned above. Alternately, the filter cake can be fluidized by addition of a deflocculant and then spray dried to produce a dry so-called "predispersed" product in dustless form. Although aqueous suspensions of our bulked clay contain added deflocculant to increase fluidity, these suspensions are not truly in deflocculated or dispersed condition because the bulked, flocced structure is retained. Thus, these slurries can be termed "partially deflocculated" slurries or suspensions.

The amount of deflocculating (dispersing) agent used to fluidize the washed filter cake is typically less than conventionally used for secondary dispersion. Thus, secondary dispersant is generally used with coating grades of clay in amount in the range of about 0.3% to 0.5% based on the dry clay weight. Dispersant levels much greater than 0.2% have been found to convert low viscosity slips of clays bulked by this invention to slips having high viscosity. After addition of dispersing agent, the filter cake is then subjected to controlled agitation to redisperse the clay particles.

The resultant bulked polyelectrolyte treated clay product, after addition of a clay deflocculating agent, is used to form high solids (at least 60% clay solids) suspensions in water. These suspensions are then formed into aqueous coating colors suitable for applying on paper. Alternatively, the bulked product may be used as a filter for paper webs.

The kaolin clay pigments bulked in accordance with practice of the present invention are especially useful in preparing coating colors for coating lightweight publication papers, particularly magazine stock, to achieve coated papers having excellent opacity and printability. Coat weights of light weight coated publication papers are usually in the range of 3 to 7 lbs/3000 ft². The printability and opacity are generally at least equal (and usually superior) to that achieved by the commercially used blend of delaminated kaolin clay and calcined kaolin clay.

Typical pigments of the invention have the following properties:

| | |
|---|---|
| G.E. Brightness, % | At least 85 |
| +325 mesh residue, wt % | Less than 0.001 |
| Particle size | |
| % Finer than 2 micrometers | At least 80%, |
| Average size, micrometer | 0.6–0.8 |
| Scattering coefficient, m²/g | |
| @ 457 nm | At least 0.15 |
| @ 577 nm | At least 0.11 |
| Brookfield Viscosity of | |
| 62% solids slurry, cp | |
| @ 20 rpm | Below 1000 cp, preferably below 500 cp, most preferably below 300 cp. |
| @ 100 rpm | No greater than at 20 rpm |
| Hercules end point, "A" bob viscosity (rpm//dyne-cm × 10⁵) | Above 800 rpm, preferably above 500 rpm and, most preferably, no more than 16 × 10⁵ dynes at 1100 rpm. |

We believe bulked clay pigments of the invention possess adequate shear stability to survive production and handling conditions such as described above, using conventional commercial processing equipment and also are sufficiently stable for use in high speed coaters used by paper industry.

In preparing coating colors, conventional adhesives or mixtures of adhesives are used with the deflocculated clay slip. For example, useful coating color compositions are obtained by thoroughly mixing with the clay slip from about 5 to about 20 parts by weight adhesive per 100 parts by weight of polyelectrolyte treated clay. Such a coating color, when used for coating lightweight publication paper, produces a product which has excellent opacity, gloss and printability.

The term "adhesive" as used herein refers to those materials known for use in connection with paper pigments, which aid in binding the pigment particles together and, in turn, binding the coating to the paper surface. Such materials include, for example, casein, soybean proteins, starches (dextrins, oxidized starches, enzyme-converted starches, hydroxylated starches), animal glue, polyvinyl alcohol, rubber latices, styrene-butadiene copolymer latex and synthetic polymeric resin emulsions such as derived from acrylic and vinyl acetates. When the adhesive comprises a starch which is jet cooked in the presence of added bulking pigment, we believe the use of a mixture of nonionic surfactant and sodium polyacrylate will permit the steam jet cooking of this mixture and will avoid the development of extremely viscous, unworkable coating colors. Steam jet cooking of a coating color composition is described on a Canadian Pat. No. 1,140,332. Typical temperatures are 225°–325° F.

The coating color compositions prepared in accordance with the present invention can be applied to paper sheets in a conventional manner.

All particle sizes used in the specification and claims are determined with the SEDIGRAPH ®5000 particle size analyzer and are reported as equivalent spherical diameters (e.s.d.) on a weight percentage basis.

In the examples, test results were obtained by the following TAPPI (Technical Association of the Pulp and Paper Industry) procedures for paper:

75° gloss—TAPPI Standard T480 ts-65. Value denotes the evenness or smoothness with which a coating lays on the surface of paper.

B & L opacity—TAPPI Standard T425-M-60

G. E. brightness—TAPPI Standard T452-M-58

Furthermore, light scattering and gloss of pigments were determined in some instances. This was done by coating the kaolin clay suspensions onto black glass plates at a coat weight of 7.0–14.0 g/m² (expressed as dry clay). The reflectance of the coatings after drying in air at wavelengths 457 nm and 577 nm is measured by means of an Elrepho reflectometer. The reflectance values are converted by the use of Kubelka-Munk equations to light scattering values (m²/g). The light scattering values are a measure of the opacity potential of the clay because the higher values indicate that light rather than passing through is reflected and scattered back. The higher the light scattering value, the higher the opacity potential of the clay. Reflectance is measured at two different wavelengths. The 457 nm wavelength corresponds to the wavelength used in the TAPPI brightness measurement and the 577 nm wavelength to that used to measure opacity.

In preparing slurries for measurement of high shear (Hercules) and low shear (Brookfield) viscosity, Engelhard Corporation procedure PL-1 was used. Brookfield viscosity was measured using TAPPI procedure T648 om-81 at 20 rpm using the #1 or #2 spindle; in some cases Brookfield viscosity was measured at 100 rpm using the #3 spindle. All slurries were formulated with optimum amount of dispersant, following the PL-3 procedure of Engelhard Corporation. Following are descriptions of PL-1 and PL-3 procedures.

PL-1 is the standard laboratory makedown method for hydrous clays at 70% solids under high shear conditions. Hydrous clays may also be madedown at other solids such as 68% solids for delaminated clays utilizing this procedure and adjusting the amount of water needed.

Equipment and Material
Analytical balance
Aluminum tins for weighing
Electric, forced air oven
Laboratory balance, accuracy±0.1 grams
Waring Blendor ® mixer (belt driven by ¾ HP motor, with pulley to provide 10,500 RPM).
1000 ml and 600 ml unbreakable beakers
500 grams oven dry clay
214 grams deionized water
Dispersant (as required), i.e., tetra sodium pyrophosphate (TSPP) or organic such as Colloids 211

Procedure for Preparation of 70% Solids Clay Slurry

A. Formulation for 70% solids clay slurry

| | |
|---|---|
| Deionized Water | 214.0 gms |
| Mineral (O. D.) | 500.0 gms |
| Total | 714.0 gms |

B. Determine the moisture content of the mineral to be used by drying a 3 gram sample in the oven for 30 minutes at 220° F. and cooling in a dessicator for 15 minutes before reweighing.

C. Place 214 grams of distilled water in the Waring Blendor (subtract moisture in clay from 214 grams). If a dispersant is to be used, add it to the water and mix in the blender for 30 seconds.

D. Weigh the oven dry equivalent of 500 grams of clay into a tared beaker. Add the 500 grams of clay to the water using a small scoop. After the addition of each scoop of clay to the water, "jog" the switch on the motor "off" and "on" momentarily to disperse the clay into the water. Do not allow the motor to attain full speed during the incorporation of the clay into the water. Only allow the blender to come to full speed after all the dry clay has been added. Excessive additional shear on the clay/water slip (particularly in the case of delaminated clays) will effect the reproducibility of rheological measurements on a given sample.

E. When all the clay has been added to the water, scrape the clay on the sides of the blender into the slurry with a spatula. Let the slip mix under full agitation for 60 seconds.

F. Transfer the slip to a tared 600 ml unbreakable beaker and cap tightly to prevent evaporation of water. (Aluminum foil provides a good "capping" material).

G. Cool the clay slip to 80° F. and determine the final solids content. The solids should be within ±0.2% or adjustment is necessary. Adjustment can be made if the percent solids is too high by the addition of water. However, if the percent solids is too low, the slip will have to be discarded and a new one made.

H. Rheological properties of the slip should be measured and recorded in accordance with standard methods.

Procedure for Determining Maximum Slurry Solids

Maximum slurry solids is dependent on optimum dispersion. Therefore, the attainment of maximum solids requires prior knowledge of the optimum dispersant demand for the particular pigment under investigation. Follow PL-3, described hereinafter, for determining the optimum dispersant level before proceeding with the following steps.

A. Follow the procedure outlined in steps C through G for the preparation of a 70% solids slurry, employing the previously determined optimum dispersant level (with some clays it may be necessary to start at slightly lower solids levels to produce a flowable mixture at optimum dispersant levels).

B. Add an additional quantity of clay until a non-flowable mixture is produced by the blender.

C. Add additional dry dispersant such as TSPP at the rate of 0.30% on the weight of the additional clay added in step B. Mix for 5 seconds.

D. The slurry should fluidize with the addition of the dispersant. Repeat steps B and C unitl the slurry no longer fluidifies after the dispersant addition.

E. The solids content at this point is recorded as maximum operable solids for this clay.

dispersant level. The optimum dispersant level for Hercules viscosity may be different than the optimum Brookfield viscosity and therefore Hercules or Brookfield optimum should be specified.

Equipment
Modified Waring Blender (belt drives by $\frac{3}{4}$ HP motor, with pulley to provide 10,500 RPM)
Hercules Viscometer
Brookfield Viscometer
Talboy variable speed mixer
Constant temperature bath
Laboratory balance (0–10 grams)
Deionized water
Pigment (500 oven dried grams or 250 grams for calcined clay)
Dispersant (inorganic or organic)
Electric, forced air oven at 105±3° C.

Procedure

Prepare hydrous kaolin by PL-1 method (supra). Add no dispersant for predispersed clay and minimum amount (about 0.2%) of dispersant for pulverized clay.

B. Determine the percent solids of the sample by drying part of the sample in an oven. Solids should be 70±0.2% for hydrous clay, 68±0.2% for delaminated clay, 50±0.2% for calcined clay and other solids as required.

C. Determine the Brookfield viscosity and Hercules viscosity of the sample.

D. While mixing the sample using the Talboy mixer, add 0.05% dispersant based on pigment weight and continue mixing for five minutes.

E. Determine the Brookfield viscosity and Hercules viscosity.

F. Repeat D and E unitl the viscosity increases (becomes poorer).

G. Optimum viscosity is the amount of dispersant added before the viscosity increases or there is no viscosity change. The solids, dispersant level and Brookfield and Hercules viscosity are reported at optimum viscosity.

Hercules viscosity values reported herein were measured with Hercules Hi-Lo Shear Viscometers, Model ET-24-6. These instruments are equipped with a cup to contain the sample fluid and are supplied with a series of rotating bobs and spring sets which provide a variety of shear rate conditions. One Hercules viscometer was equipped with the "A" bob and was employed to operate with the 100,000 dyne cm/cm spring up to 1100 rpm for clay water slurries; the other was set to operate with a 400,000 dyne cm/cm spring up to 4400 rpm to measure viscosity of coating colors. Following are details of the "A" and "E" bobs.

| Bob | Bob Height | Bob Radius | Cup-Bob Clearance | S Value | Max. Shear Rate @ 4400 rpm | Shear Rate Factor (Factor × rpm) = Shear Rate) |
|---|---|---|---|---|---|---|
| A | 5.0 cm | 1.95 cm | 0.05 cm | 0.00020 | 18196 sec.[1] | 4.14 |
| E | 5.0 | 1.98 | 0.02 | 0.00008 | 45900 | 10.42 |

This method determines the amount of dispersant to obtain minimum viscosity of clay.

Optimum dispersion is determined by the PL-3 procedure which involves making small additions of dispersant to a slurry, mixing and then determining the Hercules and Brookfield viscosity. The dispersant level before the viscosity increases (becomes poorer) is the optimum TAPPI Procedure T648 om-81 gives further description of the procedures used to measure high shear viscosity. It is common to report high shear viscosity of clay-water as either dyne-cm $\times 10^5$ torque at 1100 rpm bob speed or as bob speed in rpm at which the maximum torque of $16 \times 10^5$ dyne-cm was obtained. Similarly, the coating color viscosity is reported as either dyne-cm $\times 10^5$ torque at 4400 rpm bob speed or as bob speed in rpm at which the maximum torque of $64 \times 10^5$ dyne-cm was obtained.

Viscometers were operated in the manner summarized below:

1. Set the graph and pen in place on the recording drum (pen is placed on origin on graph paper).
2. Remove the cup and bob from the water bath at 80° F. and dry.
3. Pour 28±2 cc. of the fluid to be tested into the cup and set in place on the viscometer. Use of a syringe will frequently facilitate filling the cup.
4. Attach the bob by rotating it counter-clockwise making it only finger tight, then imerse it in the fluid cup to its limit. The fluid should come up to the top of the bob. If not, then more fluid must be added until it covers the bob.
5. Start the viscometer motor (lower left front of viscometer).
6. Press the "AUTO" switch on the control panel. The pen will proceed to draw a graph of shear rate versus shear force (torque). If the viscometer reaches its maximum rpm setpoint, the pen will automatically return to its starting point. However, if the pen goes beyond the maximum allowable torque before reaching maximum rpm, the viscometer will automatically shutdown and the recording drum will have to be returned to its original position using the crank handle.

The precision is based on a dyne-cm $\times 10^5$ reading at 1100 rpm and rpm reading at 16 dyne-cm $\times 10^5$ because there are the values reported for products. The 95% confidence level for the precision for three operations at two different viscosities follows:

| Average | Precision |
|---|---|
| 4.4 dyne-cm $\times 10^5$ at 1100 rpm | 16.8% |
| 500 rpm at 16 dyne-cm $\times 10^5$ | 21.4% |

In measuring printing properties by the so-called 75° Gloss Ink Holdout Test, the procedure used was one described in a publication by Otto P. Berberich, TESTING PRINTABILITY OF PAPER AND BOARD WITH INK—III, November 1957 IPI. The procedure gives results relative to the printing qualities on a letter press proofpress using halftone printing plates.

The K & N Ink Holdout Test entails applying an excess of heavy bodied black pigmented printing ink to coated paper, removing the excess and ascertaining the contrast between the image and the background.

In measuring printability of the paper coated with the coating color, the Helio test was used. This test is widely used to evaluate printability by the gravure method. In the test, the coated sheet is printed with a gravure cylinder, which has a pattern of ink holding cavities that decrease in diameter from one end to the other. Thus the test print has large dots at one end and small ones at the other. Skipped dots are counted starting at the large-dot end, and the print quality is reported as the distance in millimeters from the start of the test print to the 20th missing dot. For a given coat weight, the longer the distance in millimeters the better the printability of the coated paper.

The examples describe results for making down slurries of experimental and control pigments using laboratory and pilot plant procedures. In the laboratory procedure, Waring Blendor ® mixer Model 31 BL 46 was used with a 40 oz. blender jar and cover and a Variac power supply control. An amount of dispersant (typically 0.25% Colloid 211 or 0.25% TSPP based on the dry weight of the pigment) is dissolved in water calculated to provide a 62.0–62.5% solids slurry containing 300 g. of pigment. Three hundred (300) g of pigment was added gradually at moderate speed. When allof the pigment was added, the blender was run for one minute at 50 volt Variac setting. Pilot plant makedown was performed with a Cowles mixer (10" vessel dia, 4" blade dia, 3300 rpm blade speed, 3455 ft/min tip speed). Dispersant was added to water, followed by addition of pigment to water, as in the laboratory procedure, and mixed at slow speed. The mixer was then run at 3300 rpm for 5 minutes.

EXAMPLE I

The kaolin pigments used in this example were prepared from a sample of a deflocculated aqueous suspension of Georgia kaolin clay. The deflocculating agent was sodium silicate. Solids content was about 35%. The particle size distribution of the clay in the deflocculated aqueous suspensions was 55–60% less than 2.0 micrometers, 1.3–1.6 micrometers median diameter and 10–11% less than 0.3 micrometers diameter. This suspension was diluted with water to between 15 and 20% solids. The diluted suspension was separated by gravity sedimetation to provide supernates containing particles of 0.70 micrometers ("Coarse"), 0.62 micrometers ("medium") and 0.55 micrometers ("fine") median particle size (e.s.d.). The pH of separated suspension fraction was 8–10. It was reduced to 7.0 with 10% aqueous sulfuric acid. A commercially available dimethyl diallyl quaternary ammonium chloride polymer (Polymer 261 LV) concentrate was diluted to 1% solids and added to the separated suspension fractions with stirring for 5–10 minutes, and the pH of the fraction was adjusted to 2.5 with sulphuric acid. The "fine" fraction was treated with 0.07% and 0.09% polymer and the "coarse" fraction with 0.07% polymer. The percentages are given on the basis of dry polymer to dry clay. The treated suspension was bleached with sodium hydrosulphite by its addition to the fractions at the rate of 10 lbs. per dry ton of clay. After standing 30 minutes, the bleached fractions were vacuum filtered, and the filter cakes were washed with cold water until the filtrate measured 5000 ohm-cm specific resistance.

The washed filter cakes were then deflocculated with tetrasodium pyrophosphate by kneading the dry salt into the filter cake with a spatula. The amount of phosphate used was 0.1% based on the weight of dry clay. Kneading was continued until the wet filter cake became pourable at which point it was transferred to a Waring Blendor ® mixer. The filter cake was then formed into a fluidized suspension by agitation in the Waring Blendor mixer. The resultant clay suspensions had solid contents of 55 to 62%.

The fluidized clay suspensions were spray dried and the spray dried clays were formed into coating colors (56% solids) by mixing 100 parts of the treated clay with 7 parts of cooked hydroxyethylated starch (Penford Gum 280, 30% solids) and 4 parts styrene-butadiene latex (Dow Latex 620, 50% solids). All quantities in the preceding sentence are expressed in terms of dry ingredients. The colors were coated on the wire side of a 24 lb. lightweight paper basestock using a coater equipped with an air pressure loaded coating blade so that the coatings could be applied in the range of 3 to 6 lbs./3000 ft² ream. The sheets were conditioned at 50% relative humidity and 72° F. and were calendered on two different laboratory calendering units: Unit A, 2 nips at 140° F. and 250 pli; and Unit B, 3 nips at 140° F. and 500 pli (pounds per linear inch).

The opacity and gloss of the calendered sheets were determined using TAPPI (Technical Association of the Pulp and Paper Industries) procedures. Opacity was determined in accordance with TAPPI Standard T 425-M-60 and Gloss in accordance with TAPPI Standard T 480ts-65. Opacity and gloss are recorded in percent, the higher the percent the better the opacity and gloss.

The opacity, gloss and printability measurements are summarized in Table I below. The data in Table I are linear regression values based on measurements at three different coat weights, and then calculated for the 5 lb./ream coat weight.

For purposes of comparison, a control color was prepared wherein the pigmentation consisted of 90 parts LITECOTE ® clay and 10 parts ANSILEX ® clay. LITECOTE is a commercial delaminated pigment with a median equivalent spherical diameter of 0.70 micrometers. ANSILEX is a commercial calcined pigment with a median equivalent spherical diameter of 0.80 micrometers. The solids content of this coating color was 57%. Coating and testing procedure was identical to those used with other pigments in EXAMPLE I.

TABLE I

| | | Properties of Sheet Coated with Coating Color Containing Polymer Treated Clay | | | | | |
|---|---|---|---|---|---|---|---|
| | | Calender Unit A | | | Calender Unit B | | |
| Clay Particle Size | Polymer Conc. (%) | Sheet Opacity (%) | Gloss (%) | Helio-Print-ability (mm) | Sheet Opacity (%) | Gloss (%) | Helio-Print-ability (mm) |
| Fine | 0.07 | 88.3 | 49.1 | 63 | 87.1 | 49.3 | 87 |
| Fine | 0.09 | 88.4 | 46.8 | 63 | 86.8 | 47.7 | 96 |
| Coarse | 0.07 | 87.8 | 40.3 | 63 | 86.9 | 43.1 | 96 |
| Control | — | 87.4 | 48.0 | 55 | 86.0 | 47.8 | 83 |

Data in TABLE I indicate that the experimental pigments surpassed the control (LITECOTE/ANSILEX) in printing quality and opacity, and generally produced sheet gloss comparable to that of the control. The data also show that the coarse clay tends to lose gloss but maintains printability.

The data also show that raising the Polymer 261LV level to 0.09% tended to maintain the bulking effect. However, clay slips and coating colors prepared using clays treated at this concentration level tend to exhibit an adverse increase in viscosity.

EXAMPLE II

Part A

For purposes of further comparison, the bulking of "fine" (0.55 micrometer) particle size kaolin clay was attempted using a variety of commercially available amines, amine salts quaternary ammonium salts and cationic polymers commercially used for the flocculation of particulate matter suspended in water. The procedure of EXAMPLE I used to prepare the bulked kaolin clay with Polymer 261LV was repeated with each of the flocculants including Polymer 261LV. Bulking was rated by estimating the increase in thickening of the clay dispersion containing 25% clay solids after the addition thereto of 0.07% of the flocculating agent, the percentage being based on the weight of the dry clay. If there was no observable thickening of the dispersion after the addition thereto of the individual flocculating agent, the bulking effect was rated "none." If a light creamy consistency was imparted, the bulking effect of the flocculant was rated "slight." If a thickening of the dispersion occurred which was observable when the dispersion was poured, the bulking effect was rated "some." The bulking effect caused by the Polymer 261LV was rated "considerable" because it nearly solidifies the slurry so that it would not pour.

The bulking ratings of the various flocculants evaluated in the comparative study are recorded in TABLE II below:

TABLE II

| Commercial Product/ Manufacturer's Designation | Manufacturer's Description | Bulking Rating |
|---|---|---|
| Calgon/261LV | Polyquaternary Ammonium Chloride | Considerable |
| Betz/1190 | Polyquaternary Ammonium Salt | Slight |
| Nalco/8674 American Cyanamid | Polyquaternary | None |
| /S-5622 | Cationic Polymer | Slight |
| /S-5623 Allied Chemical | Cationic Polymer | Slight |
| /C-315 | Cationic Polymer | Slight |
| /C-305P | Cationic Polymer | Slight |
| Betz/1180 | Polyamine Salt | None |
| Betz/1185 | Polyamine Salt | None |
| Betz/1175 | Polyamino-Amide | None |
| Nalco/7607 | Polyamine-epichloro-hydrine | Some* |

*When concentration increased to 0.14 and 0.21% bulking effect did not approach Calgon 261 LV.

Results reported in TABLE II indicate that among the materials listed, polydimethyl diallyl ammonium chloride was unique in the bulking of the kaolin clay dispersion at the concentrations evaluated in these tests.

Part B

Further testing was carried out to evaluate the ability of various commercial cationic polymers materials supplied for use as flocculating or coagulating agents to flocculate kaolin clay suspensions and to produce dried opacifying pigments capable of being formed into clay-water solids of about 62% solids which have acceptable high and low shear rheology.

The kaolin clay used in the testing was a fraction of a crude mined in central Georgia (Washington County), the clay fraction having been selected to having a desirable particle size distribution for purpose of the invention using Calgon 261LV polymer at the 0.08% addition level. Particle size of the fraction was 90%±2% by weight finer than 2 micrometers; 50% by weight finer than 0.57%±0.03% micrometers and no more than 20% by weight finer than 0.3 micrometers. The clay fraction was provided as a 20% solids slurry and contained a mixture of sodium silicate and sodium carbonate as the deflocculating agent. The pH was about 7. The cationic polyelectrolytes used in the testing, in addition to Calgon 261LV, were materials supplied under the following registered trademarks: NALCOLYTE 7107, NALCOLYTE 8102, NALCOLYTE 8100, NALCOLYTE 8101, and NALCLEAR 7122.

In carrying out the settling tests, portions of the 20% solids slurry were diluted in graduated cyclinders to about 10% solids by adding sufficient water to form 100 ml of diluted slurry (10 g dry clay/100 ml diluted slurry). The contents of each cylinder were mixed by covering its mouth and rapidly inverting the cylinder several times.

The effectiveness of the various treatments in bulking (flocculating) the suspensions was investigated by observing the settling characteristics of each suspension over a period of time. The concentrations and the results after 26 hours settling are summarized below for those cationic materials which exhibited settling characteristic when added at the given level similar to Calgon 261LV at the 0.08% addition level. At all time intervals between 1 and 26 hours, slurries treated with these agents using the amounts shown below exhibited settling characteristics similar to or slightly better than those measured with Calgon 261LV at the 0.08% level.

| Polymer | Quantity by Weight* | mm of Supernatant Liquid | Clarity of Supernatant liquid |
|---|---|---|---|
| 7107 | 0.25% | 30 | Clear |
| 7122 | 1.00% | 32 | Clear |
| 8100 | 1.00% | 29 | Clear |
| 8101 | 1.00% | 29 | Clear |
| 8102 | 0.50% | 30 | Clear |
| Calgon 261 LV | 0.08% | 29 | Clear |

*Based on dry clay basis.

Based on these results, evaluations of pigments were made to determine opacification (light scatter) and ability to be dispersed in water at about 62% solids to form fluid slurries. Rheology of dispersed slurries was evaluated at a lower solids concentration when a 62% solids slurry could not be formed. The sample of clay used in these tests was obtained from the same mine and processed in the same way used to produce a fractionated clay having the same particle size distribution as the clay used in the settling experiments described above. The pigments were prepared by adding polyelectrolyte to a 20% solids clay slurry at pH 7, acidification to pH 3 with sulfuric acid, addition of K-Brite Brand sodium hydrosulfite bleach in amount of 8 pounds per ton of dry clay, aging for 30 minutes followed by filtration, and washing the filter cake with cold water. After drying in an oven and pulverizing, each pigment was dispersed at 62% solids with the addition of 0.025% (dry clay basis) of Colloid C-211 sodium polyacrylate dispersant by agitating in a Waring Blendor mixer at a 50 volt setting for one minute. Then further polyacrylate was added, if necessary, to reach minimum Brookfield viscosity at 20 rpm. The results are summarized below:

Effect of Bulking Kaolin Clay with Various Cationic Polyelectrolytes on Optical and Rheological Properties

| | Slurry Properties and Composition | | | | | | |
|---|---|---|---|---|---|---|---|
| | | | Brookfield Viscosity | | Hercules | Black Glass Scattering $m^2/g$ | |
| | | | cp. | cp. | Endpoint | | |
| Polymer, % | % Solids | pH | 20 rpm | 100 rpm | Viscosity | @ 457 nm | @ 577 nm |
| None | ** | ** | ** | ** | ** | .128 | .093 |
| Calgon 261 LV, 0.08% | 62.5 | 7.2 | 50 | 60 | 560/16 | .153 | .127 |
| Nalcolyte 7107, 0.25% | 62.2 | 7.2 | 50 | 59 | 1100/1.2 | .150 | .102 |
| Nalcolyte 8101, 1.0% | 62.0 | 7.2 | 75 | 87 | 410/16 | .178 | .134 |
| Nalcolyte 8100, 1.0% | 62.2 | 8.0 | 100 | 103 | 655/16 | .185 | .136 |
| Nalcolyte 8102, 0.5% | 61.1 | 7.0 | 55 | 80 | 500/16 | .189 | .138 |

**Not Determined.

When similar tests were carried out with a sample of ASP® 100 hydrous kaolin, the results were in general similar; however, scatter at 457 and 577 nm was lower. The particle size of this clay was 92% by weight finer than 2 micrometers, 50% by weight finer than 0.4 micrometer, and 35% by weight finer than 0.3 micrometers.

EXAMPLE III

For purposes of still further contrast, the procedure of EXAMPLE I was repeated with the exception that the kaolin clay was not treated with Calgon Polymer 261LV prior to its incorporation in the coating color. The clay used in this test was the "fine" kaolin clay of EXAMPLE I. Polymer 261LV was added to the coating color at a concentration of 0.07% by weight based on the weight of the untreated clay already incorporated in the coating color. When this comparative coating color was coated on paper base stock and calendered in Unit A, in accordance with the procedure of EXAMPLE I, gloss of the calendered sheet was lowered by 3 points. Opacity was lowered by 0.6 points relative to sheets of equal coat weight prepared from the same clay treated with 0.07% polymer as described earlier in EXAMPLE I, indicating that incorporation of Polymer 261LV in the coating color in this manner did not produce the desired improvement.

EXAMPLE IV

The procedure of Example I was followed to prepare filter cakes containing kaolin particles of fine, medium and coarse particle size treated with 0.07% by weight Polymer 261LV based on the weight of the clay solids. The filter cakes were formed into suspensions by agitation in a Waring Blendor® mixer in the presence of added tetrasodium pyrophosphate in sufficient quantity to yield a fluid dispersion for 1 minute using either low or high shear conditions. Low shear conditions were obtained with a setting of 40 on the rheostat which controlled the power input to the mixer and high shear conditions with a rheostat setting of 100. The Brookfield and Hercules (high shear) viscosities and the light scattering and gloss of the clay suspensions prepared under high and low shear conditions are recorded in TABLE III below. It is believed that dispersant addition level, which was not measured, was not optimum.

The procedures of EXAMPLE I were also repeated to prepare coating colors from the suspensions of polymer treated clays ("fine", "medium", and "coarse" fractions) by mixing 100 parts of the clay slips with 7 parts hydroxyethylated starch and 4 parts styrene butadiene latex (under low and high shear conditions). The amounts of the ingredients used in the formulation of coating colors are given on a dry weigh coating basis. The control coating color was prepared in the same way as in EXAMPLE I. The Brookfield and Hercules viscosities, light scattering and gloss of the coating colors containing the polymer treated clay slips are recorded in TABLE III below.

mally altered when compared to those values of the Polymer 261LV treated clay dispersed under low shear conditions as evidenced by the almost total lack of change in the light scattering and gloss values at $S_{457}$ and $S_{577}$.

EXAMPLE V

Coating colors were prepared using clay slips of 0.55 micrometer and 0.62 micrometer size kaolin clay treated with 0.07% Polymer 261LV under high and low shear dispersion conditions following the procedure of EXAMPLE IV. The colors were coated on paperbase stock to a coat weight of 5 lbs/3300 ft$^3$ ream. The coated sheets were calendered in steps at 140° F. and 500 pli. The steps are designated as "nips", (1, 2, 3 nips).

TABLE III

Rheology, Light Scattering and Gloss of Water Suspensions of Polymer 261LV Treated Clay

| Clay Particle Size | Shear | Solids (%) | Viscosity Brookfield (20 rpm) (cps) | Hercules* (rpm) | Gloss % | Black Glass Coating-Light Scattering $S_{457}$ (m$^2$/g) | $S_{577}$ (m$^2$/g) |
|---|---|---|---|---|---|---|---|
| Fine | Low | 61.8 | 488 | 165 | 60 | 0.186 | 0.130 |
| Fine | High | 61.7 | 88 | 473 | 62 | 0.178 | 0.127 |
| Medium | Low | 61.4 | 188 | 283 | 58 | 0.182 | 0.128 |
| Coarse | Low | 61.8 | 225 | — | 51 | 0.160 | 0.115 |

*Hercules rpm at 16 dyne cm × 10$^5$ with A-Bob.

TABLE IV

Rheology, Light Scattering and Gloss of Coating Color

| Clay Particle Size | Shear | Solids (%) | Brookfield (20 rpm) (cps) | Hercules Viscosity **dyne cm × 10$^5$ | Gloss % | Black Glass Coating-Light Scattering $S_{457}$ (m$^2$/g) | $S_{577}$ (m$^2$/g) |
|---|---|---|---|---|---|---|---|
| Fine | Low | 57.6 | 8450 | 56 | 34 | 0.182 | 0.142 |
| Fine | High | 57.7 | 8200 | 54 | 36 | 0.182 | 0.143 |
| Medium | Low | 57.2 | 5200 | 48 | 24 | 0.172 | 0.136 |
| Coarse | Low | 57.7 | 6850 | — | 19 | 0.139 | 0.110 |
| Control* | — | 57.9 | 2475 | 44 | — | 0.130 | 0.100 |

*LITECOTE/ANSILEX
** @ 4400 rpm. with E-Bob.

The data recorded in TABLES III and IV indicate that regardless of particle size, the bulked clays of the invention have usable Brookfield and Hercules color viscosities; Brookfield viscosities are lower at high shear than at low shear indicating that shearing reduced the viscosity of the slips of the dialkyl diallyl quaternary ammonium salt polymer treated clay.

The light scattering and gloss values recorded in Tables III and IV indicate that the bulking structure was not destroyed by high shear and that the properties of the Polymer 261LV treated clay particles when dispersed under high shear conditions were only mini- The opacity of the calendered sheets as well as an uncalendered sheet was determined in accordance with TAPPI T 425-M-60 and the gloss of the sheets was determined in accordance with TAPPI T480ts-65. The LITECOTE/ANSILEX control was also prepared and tested as in the previous example.

The opacity and gloss results are recorded in TABLE V below. The data in Table V, like that of TABLE I, supra, are linear regression values at 5 lb/ream coat weight calculated from measurements at three different coat weights.

TABLE V

Effect of Shear Conditions on Properties of Sheet Coated With Coating Colors Prepared from Polymer 261 LV Treated Kaolin Clay

| Clay | Shear Cond. | Color Solids % | Uncalendered Op (1) | Gl. (2) | Calender Unit B 1 Nip Op. | Gl. | 2 Nip Op. | Gl. | 3 Nip Op. | Gl. |
|---|---|---|---|---|---|---|---|---|---|---|
| Fine | Low | 57.6 | 91.3 | 10.0 | 89.3 | 31.0 | 86.7 | 41.6 | 86.2 | 47.7 |
| Fine | High | 57.7 | 91.2 | 10.3 | 88.0 | 31.8 | 86.8 | 41.7 | 85.7 | 49.1 |
| Medium | Low | 57.2 | 91.1 | 7.3 | 88.1 | 26.8 | 86.2 | 37.4 | 85.6 | 44.2 |
| Control (3) | | 57.9 | 90.2 | 9.9 | 87.7 | 29.2 | 85.2 | 39.3 | 84.7 | 45.5 |

(1) Op. = Opacity
(2) Gl. = Gloss
(3) Control. LITECOTE/ANSILEX 90/10 blend.

The data in Table V indicate that shear conditions do not affect significantly the properties of coating colors prepared by using Polymer 261LV treated clay and that the improved properties of opacity and gloss exhibited by the polymer treated clay are maintained under supercalendering conditions regardless of dispersion shear. It should be noted that opacity and gloss of supercalendered sheets normally decrease as the base clay is made coarser.

EXAMPLE VI

The procedure of EXAMPLE I was followed to prepare a filter cake containing kaolin clay particles of fine (0.55 micrometer) particle size treated with 0.07% by weight Polymer 261LV (based on the weight of the clay solids). The filter cake was formed into a suspension (55% solids) by agitation in a Waring Blendor mixer for 1 minute using high shear conditions. The Polymer 261LV treated clay suspension was added to a groundwood pulp furnish, which had been previously pulped to a Canadian Standard Freeness of 125 milliliters and a fiber consistency of about 2.7 percent by weight, to produce handsheets containing a variety of net mineral contents (NMC) ranging from 4.57 to 14.28%. The pulp/clay blends were mixed in a laboratory disintegrator until homogeneous suspensions, diluted to 0.25% fiber consistency, were obtained. Handsheets were formed from the pulp/clay suspensions using a M/K Systems, Inc. Miniformer at a target basis weight of 35 lbs/3300 square feet (52.1 grams per square meter). To insure adequate clay retention, a cationic polyacrylamide retention aid sold under the trademark designation ACCURAC 620 was added to the stock in the Miniformer headbox at a concentration of 0.5 pounds per ton of fiber.

The handsheets were pressed and dried on the Miniformer and were conditioned at least 24 hours at 73° F., 50% relative humidity. Thereafter the brightness and opacity were measured.

Handsheets which had been conditioned an additional 24 hours at 73° F., 50% relative humidity were calendered (B) through two nips at 500 pli.

For purposes of control, the procedures were repeated using no filler (Control A). For further purposes of control, the procedures were repeated using an untreated kaolin clay (HT ™ clay), which has a median particle size of about 0.7 micrometers and is about 80% by weight finer than 2 micrometers (Control B).

The brightness and opacity results, adjusted to a basis weight of 52.1 g/m², are summarized in TABLE VI below.

TABLE VI

Properties of Sheets Filled with Polymer 261 LV Treated Kaolin Clay

| | Uncalendered | | Calendered | |
|---|---|---|---|---|
| NMC | Brightness % | Opacity % | Brightness % | Opacity % |
| Bulked Pigment | | | | |
| 4.57 | 67.1 | 86.1 | 67.1 | 86.4 |
| 8.21 | 67.7 | 87.4 | 67.4 | 87.6 |
| 11.42 | 68.3 | 88.3 | 67.8 | 88.5 |
| 11.28 | 68.4 | 89.3 | 67.8 | 88.8 |
| No filler (Control A) | | | | |
| 0.00 | 65.5 | 83.0 | 66.4 | 85.5 |
| Untreated HT Clay (Control B) | | | | |
| 4.09 | 66.2 | 85.1 | 66.2 | 85.7 |
| 7.26 | 57.6 | 86.1 | 67.3 | 86.3 |
| 9.58 | 67.4 | 87.1 | 67.1 | 87.0 |
| 11.49 | 67.0 | 87.6 | 67.0 | 88.1 |

The data in TABLE VI indicate that the use of Polymer 261LV treated kaolin clay as a filler produced a sheet that was relatively high in brightness, had relatively high opacity and in most cases did not lose these properties when the paper was supercalendered.

EXAMPLE VII

Tests were carried out to evaluate the utility of a bulking pigment of the invention in preparing offset printed lightweight coated paper. The bulking pigment was prepared substantially as described in EXAMPLE I from a sample of Georgia kaolin clay that was about 85% by weight finer than 2 micrometers and about 22% by weight minus 0.3 micrometers. Median particle size was about 0.6 micrometers. Calgon 261LV polymer was added in amount of 0.07%, dry weight based on the weight of the clay. After addition of polymer, the suspension was flocculated by addition of acid, bleached, dewatered and dried. The sample was slurried at 62.5% solids in the presence of 0.1% by weight of tetrasodium pyrophosphate, based on the dry clay weight using low shear conditions. A coating color was prepared, using conventional procedures and adding the following ingredients in the order listed:

| | Parts by weight (dry weight basis) |
|---|---|
| 100.0 | Pigment |
| 8.0 | Cooked Penford Gum 280 Starch |
| 8.0 | Dow 640A Latex |
| 0.8 | Sunrez 666 |
| 0.5 | Nopcote C-104 |

The pH of the coating color was adjusted to 8.0 with ammonium hydroxide solution. The coating color was applied to 24 lb. St. Regis offset base stock by a Keegan puddle blade coater to the wire side at a range of coat weights by varying the blade pressure. The coated papers were calendered prior to testing by using the Unit B calender under conditions of 2 nips, 250 pli and 140° F. Optical and printing properties were measured by standard procedures.

For the purpose of comparison, the general procedure was repeated using as control pigments, a coating grade of kaolin clay supplied under the trademark LVHT as well as 50/50 (wt.) mixture of LVHT and LITECOTE clay. I believe that these clays are representative of clay pigments used to prepare offset grades of coated paper.

TABLE VII summarizes the results obtained by testing the rheology of coating colors containing the experimental bulked pigment and the clay evaluated for purposes of comparison.

TABLE VIII summarizes the results of optical and printing properties of coated sheets.

TABLE VII

RHEOLOGY OF COATING COLORS

| Coating Color Rheology | Pigmentation | | |
|---|---|---|---|
| | LVHT | 50 LVHT 50 LITECOTE | Experimental Pigment |
| Solids (%) | 57.1 | 57.2 | 57.2 |
| pH → 8.0 | | | |
| Brookfield Viscosity (cps) Spindle No. 4 20 RPM, 80° F. | 2500 | 3350 | 8250 |
| HEP "E" (dyne-cm * $10^{-5}$) 400,000 dyne springs E-bob, 4400 RPM max. | 19 | 22 | 33 |

*Hercules "End Point"

TABLE VIII

OPTICAL AND PRINTING PROPERTIES OF COATED SHEETS

| Pigmentation | LVHT | 50 LVHT 50 LITECOTE | Experimental Pigment |
|---|---|---|---|
| Coat Weight (#/3000 sq. ft.) | 4.0 | 4.5 | 4.0 |
| Calendered Optical Properties | | | |
| 75 Deg. Sheet Gloss (%) | 47.4 | 49.1 | 46.5 |
| Elrepho Brightness (%) | 69.4 | 69.9 | 69.6 |
| Opacity (%) | 84.1 | 84.5 | 85.1 |
| Calendered Paper Properties | | | |
| Sheffield Smoothness | 16 | 11 | 23 |
| Sheffield Porosity (3 in. disc) | 49 | 44 | 206 |
| Printing Properties | | | |
| K & N Ink Receptivity (% Change) | 19.6 | 19.4 | 28.8 |
| IGT Dry Pick (vvp w/#24 oil) | 19 | 18 | 17 |
| Vandercook Flat Prints | | | |
| 75 Deg. Print Gloss (%) | 77.8 | 78.5 | 68.9 |
| Optical Density | 1.60 | 1.60 | 1.55 |
| Print-through | 76.1 | 76.6 | 76.1 |
| Ink Transfer (mg) | 36.9 | 32.6 | 40.2 |
| RI Printability | | | |
| Wet Pick (1) | 3 | 3 | 10 |

(1) Lower numbers indicate better wet pick.

Viscosity data reported in TABLE VII demonstrate the higher viscosity of the experimental pigment color.

The data in TABLE VIII demonstrate the bulking effect of the experimental pigment which was evident by its good performance in opacity, porosity, K&N ink receptivity and print-through.

EXAMPLE VIII

The following test indicates how viscosity increases can be used to determine when an effective amount of polymer is added. The results of the test also confirm the belief that Calgon 261LV polymer functions to flocculate high solids dispersions of hydrous kaolin clay. The clay used in the tests was ULTRAGLOSS 90 ® clay, a predispersed, ultrafine particle size kaolin clay, 98% by weight of the particles being finer than 2 micrometers 90% by weight being finer than 1 micrometer and median particle size of about 0.3 micrometers. The clay was provided as a spray dried product containing about 0.35% by weight of tetrasodium pyrophosphate which was added to a slip of the clay prior to spray drying. Calgon 261LV was added in increments to a 65% solids deflocculated suspension of the clay (700 g clay.) This solids concentration was used to facilitate the observation of the thickening effect of the polymer addition. Brookfield viscosity (20 r.p.m.) was measured after each addition until the desired total of 0.07% dry weight of polymer was added based on the dry weight of the clay. Initial additions appeared to slightly decrease in viscosity. However, when about 60% of the amount generally effective to produce a bulked clay product using fine clay was added, viscosity began to increase and continued to increase until the total polymer addition was 0.07% (dry weight) based on the dry weight of the clay. The data is in TABLE IX.

TABLE IX

Effect of Addition of Calgon 261 LV Polymer on Viscosity of High Solids Deflocculated Clay Suspension

| Volume of Total Added (1% Solution of Polymer 261 LV) | Brookfield Viscosity, cp |
|---|---|
| 0 ml | 180 |
| 10 ml | 164 |
| 20 ml | 152 |
| 30 ml | 186 |
| 40 ml | 272 |
| 50 ml* | 400 |

*Final solids = 59%

EXAMPLE IX

The following is another example of the invention carried out using production scale equipment.

A high purity kaolin crude clay from a deposit in Washington County, Ga., known as North Jenkins crude, was degritted, dispersed in water with sodium silicate having a $Na_2O/SiO_2$ weight ratio of about 3/1 and sodium carbonate. The suspension was then fractioned in a centrifuge to 87% finer than 2 micrometers. The median particle size of the fractionated suspensions was 0.59±0.03 micrometers; weight percentage finer than 0.3 micrometers was 17%. Solids were about 20% and pH about 7. The suspension was then passed through a high intensity magnetic separator magnet for purification. Calgon 261LV polymer was added to the suspension of purified clay at the 0.08% level based on dry weight of clay. The polyelectrolyte was added as an aqueous solution of about 2% (wt.) concentration. The pH was adjusted to about 4 to 4.5 by addition of sulfuric acid and the sodium hydrosulfite ($Na_2S_2O_4$) bleach was added in amount of 6/ton of clay. The slurry was then filtered on a rotary vacuum filter to produce a filter cake having 55-60% solids. The filter cake was throughly washed with cold water and dispersed by adding tetrasodium pryophosphate in amount of 0.1% based on the dry clay, followed by kneading. The pH of the fluidized cake was adjusted to 6.5-7.0 by addition of sodium hydroxide. The suspension was then dried by spray drying.

Using this crude, desired properties were:

| | |
|---|---|
| G.E. Brightness, % | 86.5-87.0 |
| +325 mesh residue, % | 0.001 |
| Scattering coefficient(s), m²/g | |
| at 457 nm | 0.160 |
| at 577 nm | 0.120-0.140 |

The scattering values shown above for the experimental pigment are two times greater than typical No. 1 grades of domestic hydrous coating clay. When such an experimental pigment is used as the sole coating pigments in offset paper coating formulations at 3 to 6 lbs/3300 ft² coat weights, these scattering values translate to sheet opacities comparable to those normally obtainable with paper coatings containing from 5 parts by weight of $TiO_2$ or 10 parts calcined clay. In addition, the greater hiding of the basestock can result in coated offset paper brightness comparable to those obtainable using coating clay having higher brightness. Pigments of the invention can have higher brightness values than those mentioned above provided the clay feed to which polyelectrolyte is added has a higher brightness and/or colored impurities are removed by flotation or other means.

The viscosity of dispersed clay-water slurries of pigments of the invention prepared from this and similar fractions of crude kaolin is typically intermediate that of standard delaminated clay and fine particle size calcined clay used in paper coating. This is demonstrated by the following summary of typical properties:

| | ANSILEX ®<br>Calcined clay | Product of<br>the Invention | NUCLAY ®<br>Delaminated Clay | HT ™ No. 2<br>Coating Clay |
|---|---|---|---|---|
| Solids % | 50.0 | 62.3 | 67.8 | 69.9 |
| pH | 6.4 | 6.8 | 6.7 | 6.3 |
| Brookfield Viscosity (cps) | | | | |
| 20 rpm | 30 | 210 | 320 | 205 |
| 100 rpm | 50 | 165 | 290 | 145 |
| Hercules End Point Viscosity "A" Bob, 27° C. | 840/16.0 | 1100/9.9 | 340/16.0 | 1100/4.3 |

It has been found that makedown is best at 62-63% maximum solids for dispersing. Higher solids are possible but difficult and can yield high Brookfield viscosities.

The rheology, scatter and gloss of the spray dried pigments of the invention will vary with solids of dispersion, amount and species of additional dispersant, if any, and pH. Also, the amount of work input used to prepare the pigment slurry before and after spray drying will affect these properties. The effect of some of these variables is shown by data for the pigment prepared in this example with 0.08% Calgon 261 LV. Makedown was by the laboratory procedure described above.

| % Solids | Waring* Speed | Colloid 211% | Viscosity 20 rpm Brookfield | Hercules** | m²/g Scattering S457 | S577 |
|---|---|---|---|---|---|---|
| 62 | 50 V | 0.025 | 100 | 1100/3.7 | .174 | .126 |
| 62 | 110 V | 0.025 | 90 | 1100/2.0 | .162 | .114 |
| 64 | 50 V | 0.025 | 140 | 780/16 | .175 | .129 |
| 64 | 110 V | 0.025 | 150 | 1100/6.1 | .160 | .112 |
| 66 | 50 V | 0.025 | 230 | 450/16 | .172 | .125 |
| 66 | 110 V | 0.025 | 320 | 535/16 | .164 | .117 |
| | | TSPP % | | | | |
| 62 | 50 V | 0.020 | 450 | 1080/16 | .187 | .138 |
| 64 | 50 V | 0.020 | 495 | 520/16 | .182 | .132 |

*Model 31 BL46. Voltage settings on power input controller
**A-Bob. 27% rpm/dyne-cm × 10⁵.

EXAMPLE X

The kaolin pigments used in this example were prepared using laboratory scale equipment from a sample of a deflocculated aqueous suspension of degritted, previously fractionated Georgia kaolin clay. The crude clay from which the degritted clay was obtained was from the Scott mine, Washington County, Georgia. The degritted clay had the following particle size distribution: 82% < 5 um; 68% < 2 um; 52% < 1 um; 50% < 0.95 um (weight median size); 25% < 0.05 um; 4% < 0.3 um. The degritted clay as received was at about 35% solids and contained sodium silicate as a deflocculating agent. This suspension was fractionated in conventional manner in a centrifuge to prepare three particle size fractions as follows: 79% < 2 um; 83% < 2 um; 90% um. The particle size distribution the 83% < 2 um fraction was 50% < 0.6 um and 18% < 0.3 um. The pH of the fractions was adjusted to 4.5 with sulphuric acid and bleached with sodium hydrosulphite by its addition to the fractions at a rate corresponding to 4 pounds per ton of dry clay. Calgon Polymer 261 LV concentrate, diluted to 1% concentration, was added to each of the separated suspension fractions with moderate stirring for 5-10 minutes. Each fraction was treated with the polyelectrolyte in amount to result in addition of 0.08%, 0.12% and 0.15% polyelectrolyte. The percentages are given on the basis of dry polymer to dry clay. In all cases, the suspensions thickened more than the flocculation induced by acid and bleach addition. The treated slurry appeared to have "creamy" consistency. After standing 30 minutes, each bleached and treated fraction was vacuum filtered, and the filter cakes were washed with cold water until the filtrate measured at least 5000 ohm-cm specific resistance.

A portion of each of the nine washed filter cakes was then deflocculated with either tetrasodium pyrophosphate in amount of 0.025% based on the dry clay weight or sodium polyacrylate, Colloid 211, in amount of 0.025% based on dry weight of the clay, by working the 40% solution of the deflocculant into the filter cake with a motor driven paddle agitator. Agitation was continued until the wet filter cake become pourable. The fluidized clay suspensions were spray dried in conventional manner. The dried pigments were redispersed in water with a Waring Blendor mixer. (Model 31 BL 46). The procedure used was to dissolve the dispersant in water, and add the pigment gradually to the water while operating the mixer at moderate speed. When all pigment was added, the blendor was run for one minute at 50 volts Variac setting. The resultant clay suspensions had solid contents of about 62%.

Viscosity of the spray dried clays was measured using the Brookfield instrument at 20 rpm and the Hercules viscometer ("A" bob). Light scattering was also tested at 457 nm and 577 nm by the black glass method. The results are reported in Table X.

Data in Table X show that addition of the quaternary ammonium polyelectrolyte at the 0.03% level resulted in a pigment having lower opacification than when used at higher levels. At the 0.15% or 0.13% addition level, scatter was better than at lower levels but low shear and/or high shear were higher than desired. Generally, the best compromise between the measured optical property (scatter) and rheology was achieved at polyelectrolyte addition levels of 0.06% and 0.08%. The data in Table X also appear to indicate that light scatter was affected by the particle size of the clay.

EXAMPLE XI

Some experimental pigments prepared under EXAMPLE X were further evaluated. Another sample (Sample 4) was prepared from the same 90%<2 um fraction, utilizing the same procedures except that 0.08% Calgon 261 LV was added before spray drying. Thus Samples 2 and 4 were prepared from the same clay using the same amount of polyelectrolyte but in Sample 2 polyelectrolyte were added before filtration and in Sample 4 polyelectrolyte was added after filtration. The samples evaluated are identified as follows:

| Sample No. | % Calgon 261 LV | % < 2 um clay in Feed |
|---|---|---|
| 1 | 0.08% | 80 |
| 2 | 0.08% | 90 |
| 3 | 0.15% | 83 |
| 4 | 0.08% | 90 |

Experimental pigments were made down to 62.0% solids slurries and slurries having minimum Brookfield viscosity were obtained by adding a suitable amount of Colloid 211. These slurries were made down in a Waring Blendor at 40 volts for one minute. Brookfield and Hercules viscosities were measured using procedures described above.

The coating colors were prepared based on the following rotogravure formulation:

| Pigment | 100 |
|---|---|
| Penford Gum | 7 |
| Dow Latex 620 A | 4 |
| Nopcote C-104 | 0.5 |

Coating colors were made down to approximately 57% solids. The pH of each color was adjusted to 8.0 with ammonium hydroxide. Brookfield and Hercules viscosities were measured using standard laboratory procedures. It was necessary to dilute the color containing the pigment prepared with addition of 0.15% Calgon 261 LV to 56% solids because Brookfield viscosity of a 57% solids color was too high.

The wire of St. Regis rotogravure basestock was coated with each coating color on the Keegan blade coater at three coat weights. Dewatering, typical of pigments of this type, was observed during the application of all colors containing experimental pigment. It was most severe with the pigment with 0.15% Calgon 261 LV. The coated sheets were dried in a rotary dryer and conditioned overnight at 72° F. and 50% relative humidity. The sheets were then weighed and coat weights determined.

When the required coat weights were obtained, the sheets were calendered through two nips at 140° F. and 250 pli. Calendered sheets were conditioned overnight at 72° F. and 50% relative humidity and tested for gloss, Elrepho brightness, opacity and Heliotest.

The rheology of clay-water suspensions of each pigment were compared. The results appear in Table XI. The slurry of pigment to which 0.15% Calgon 261 LV was added had poor high shear rheology, possibly due to insufficient shear for this treatment level during makedown. The coating color of this pigment also had a high Brookfield viscosity at 57% solids. Dilution to 56% solids still yielded a high Brookfield viscosity.

Optical properties of calendered sheets coated with experimental pigment and the control were measured. The control consisted of a blend of 90% Litecote and 10% Ansilex. The gloss of both samples prepared from fine feed was equal to greater than the control at all coated weights. Pigments made from coarser feed gave lower gloss than the control. Elrepho brightness of the experimental pigments was equal to or greater than the control at low coat weight. Rotogravure printability and opacity of experimental pigments was same or better than the control at all coat weights.

It was found that Sample 2 prepared from fine feed and 0.08% polyelectrolyte gave gloss, opacity and Heliotest values greater than the control. Elrepho brightness of coated sheets was equal to or greater than the control at 3.9 and 6.1 pounds per 3300 square foot but less than the control at 5 pounds per 3300 square foot. The overall performance of this pigment was superior to the other experimental samples in the study and generally equal to the control. Sample 4 in which polyelectrolyte was added after filtration and before spray drying was overall inferior to Sample 2.

EXAMPLE XII

Two samples of kaolin clay treated with 0.08% Calgon 261 LV polymer (EXAMPLE X) were made down in water at 62.2% and 64.2% solids at optimum conditions (dispersed with 0.025% Colloid 211). These samples were placed in a shaker water bath at 100° F. The shaking frequency was slow at about 100 cycles per minute with the amplitude of about 7 cm. Viscosity and black glass scattering were measured at the beginning and every week thereafter. It was found that light scattering increased but high shear and low shear viscosity also increased with prolonged storage at elevated temperature. The slurries had a tendency to thicken, but they could be mixed with a spatula to a workable and measurable consistency. It was subsequently found that the use of hot (120°-140° F.) water to wash filter cakes obviated the tendency of the slurries to thicken during storage.

Attempts were made to evaluate changes in the particle size distribution curves of clays after they were bulked in accordance with this invention. These attempts have not yielded clearcut results. Those skilled in the art are aware of the fact that particle size distribution curves of clays are obtained by testing deflocculated aqueous suspensions. The rate of shear used to prepare deflocculated aqueous suspensions of bulked clays of the invention strongly influences the observed particle size distribution of the bulked clay. Furthermore, when using the SEDIGRAPH analyzer, deflocculated clay suspensions being tested are diluted and subjected to vibration in a sonic bath. Such treatment could conceivably change the particle size distribution of a bulked clay by breaking down assemblages. In general, such testing indicates that bulked clay products of the invention are coarser than the clay from which the bulked clay products are derived at least in the fine particle size ranges. For example, there generally appears to be a 50% reduction in the weight percentage of particles finer than 0.3 micrometers. Starting clay, the particles of which are about 20% by weight finer than 0.3 micrometers, usually produces bulked products which when sheared at a low shear rate (Waring Blendor mixer with a variac setting of 30–40 volts) appear to be about 10–11% by weight finer than 0.3 micrometers. Changes in size distribution of particles larger than 0.3 micrometer are generally less than the accuracy limit of the SEDIGRAPH instrument.

EXAMPLE XIII

When a bulked pigment obtained by treating kaolin clay with Calgon 261 LV polymer is dispersed in water with a polyacrylate or polyphosphate dispersant and the resulting dispersed aqueous slurry is heated, the dispersed clay water slurry thickens at about 60° C. This occurs when such dispersants are either added to the washed filter cake obtained during processing or if the dispersants are added to previously spray dried bulked clay. However, if this filter cake pigment is dispersed with a mixture of polyacrylate and nonionic dispersant its heat resitivity increases markedly with a minimal effect on the performance properties of the bulked clay pigment or the vicosity of the clay water slurry. Similar resistivity improvements in heat are obtained if this dispersion is spray dried and then redispersed in water.

The following tests demonstrate how heat undesirably affects the viscosity of a slurry of bulked pigment containing a conventional dispersant. A clay-water slurry of (unbulked) feed clay (sodium silicate dispersed) was centrifuged to 62% solids. Solids were adjusted to 57%. The slurry was heated to 95° C. The slurry did not thicken.

A bulking pigment was prepared by adddding 0.08% Calgon 261 LV polymer (0.25% concentration) to a 20% solids slurry, followed by bleaching with sodium hydrosulfite bleach at pH 4.5, (adjusted with $H_2SO_4$) filtration, washing and dispersion with Mayo 148 D polyacrylate at 62% solids. This slurry was heated and it thickened at 60° C. The slurry thinned upon cooling but when it was reheated to 60° C., the slurry again thickened. This indicates that a chemical reaction was responsible for the undesirable thickening.

The following tests were carried out to demonstrate the effectiveness of mixtures of polyacrylate and nonionic surfactant in improving heat resistance of dispersed slurries of the bulked pigment. DA 630 is a nonionic surfactant made by GAF Corporation and is reported to be decyloxy poly (ethyleneoxy) ethanol. CO 610 is also a nonionic surfactant made by GAF and is reported to be nonylphenoxy poly (ethyleneoxy) ethanol.

The bulked pigment was prepared by adding 0.08% Calgon 261 LV polymer to a slurry of suitable kaolin clay feed. Sodium hydrosulfite bleach was added in amounts of 4–5 #/ton of clay in the slurry at 4.5 pH (adjusted with $H_2SO_4$) and the bleached slurry was filtered, washed and blunged with a mixture of dispersants. Brookfield viscosity was measured immediately and the heat resistance was tested the following day. The heat resistance test comprised heating the clay-water slurry at 62% solids in an open beaker on a hot plate with agitation, and observing its fluidity as a function of temperature. Results are reported below.

| Dispersant | Brookfield Viscosity | | Heat Resistance |
|---|---|---|---|
| M148D/DA630 | 20 RPM | 100 RPM | |
| .15–.15% | 35 | 55 | fluid at 92° C. |
| .175%–.10% | 55 | 67 | fluid at 92° C. |
| .10%–.10% | 50 | 65 | fluid at 85° C. |
| .15–.10% | 60 | 69 | fluid at boiling |

Various amounts of combinations of polyacrylate dispersant (Mayo 148 D) and nonionic surfactant (DA 630) were added to portions of washed filter cakes of kaolin bulked with Calgon 261 LV at the 0.08% level. The polyacrylate was first added during blunging followed by the nonionic surfactant. The results, shown below, demonstrate that mixtures of dispersants, when used at total levels above 0.175% were effective in preventing thickening at temperatures above 60° C. provided sufficient nonionic surfactant was present.

| Exp. # | Dispersant | | Viscosity | | | Scattering | | Heat Effect |
| | Total | M148D/DA630 | Brookfield | | | $S_{457}$ | $S_{577}$ | Thicken at |
| | | | 20 RPM | 100 RPM | Hercules | | | |
|---|---|---|---|---|---|---|---|---|
| 1 | .175% | .0114%–06% | 90 | 97 | 16/705 | .209 | .151 | 45° C. |
| 2 | .175% | .0875%–.0875% | 75 | 80 | 16/775 | .202 | .142 | 58° C. |
| 3 | .175% | .06%–.115% | 10800 | 7280 | 16/225 | .226 | .168 | Thick before heating (not tested) |
| 4 | .200% | .13%–.07% | 175 | 147 | 16/1020 | .181 | .125 | 48° C. |
| 5 | .200% | .1%–.1% | 75 | 73 | 16/775 | .160 | .107 | 73° C. |
| 6 | .200% | .07%–.13% | 120 | 110 | 16/425 | .184 | .127 | 45° C. |
| 7 | .250% | .1625%–.0875% | 50 | 58 | 1.0/1100 | .145 | .097 | 90° C. |
| 8 | .250% | .125%–.125% | 50 | 60 | 1.2/1100 | .144 | .096 | 90° C. |
| 9 | .250% | .0875%–.1625% | 75 | 65 | 2.3/1100 | .153 | .102 | 87° C. |
| 10 | .300% | .195%–.105% | 115 | 85 | 1.9/1100 | .170 | .118 | 83° C. |
| 11 | .300% | .15%–.15% | 90 | 70 | 1.9/1100 | .165 | .115 | 91° C. |

-continued

| Exp. # | Dispersant | | Viscosity | | | Scattering | | Heat Effect |
|---|---|---|---|---|---|---|---|---|
| | Total | M148D/DA630 | Brookfield 20 RPM | 100 RPM | Hercules | $S_{457}$ | $S_{577}$ | Thicken at |
| 12 | .300% | .105%-.195% | 70 | 65 | 4.1/1100 | .167 | .114 | 93° C. |

Also, various mixtures of polyacrylate (Mayo 148 D) dispersant and non-ionic surfactant (CO-610) were added to portions of washed filter cakes treated with 0.08% polymer (Calgon 261 LV) and bleached with 4.5 #/ton sodium hydrosulfite. The results below show slight improvement in heat resistivity when slurries of these dispersed pigments at 62% solids were heated in a beaker on a hot plate while mixing.

| EXP # | Dispersant M148D-CO610 | Brooksfield 20 RPM | 100 RPM | Hercules | Heat Effect Thicken at |
|---|---|---|---|---|---|
| 1 | .1%-.05% | 165 | 145 | 16/665 | 58° C. |
| 2 | .15%-.05% | 105 | 110 | 16/705 | 67° C. |
| 3 | .2%-.05% | 225 | 145 | 8/1100 | 60° C. |
| 4 | .2%-.1% | 105 | 100 | 16/995 | 63° C. |

While specific components of the present system are defined above, many other variables may be introduced which may in any way affect, enhance or otherwise improve the system of the present invention. For example, the polyelectrolyte treated clay of the present invention may be blended with other pigments having specific and unique properties to produce coating colors. Examples of such pigments are high glossing kaolin clay or a delaminated kaolin clay. These are intended to be included herein.

Although variations are shown in the present application, many modifications and ramifications will occur to those skilled in the art upon reading of the present disclosure. For example, polyelectrolyte can be added to unbleached clay at an alkaline dispersion pH, at acid pH levels which are typically encountered in reductive bleaching, after the addition of the hydrosulfite and sulfuric acid bleaching reagents, to the repulped filter cake both in the presence or absence of deflocculating agents, etc. Furthermore, the use of diallyl homopolymers has been described. Those skilled in the art will recognize that the polymer can be modified by introducing other monomers during the polymerization so as to modify the diallyl ammonium polymer salt.

TABLE X

BULKING PIGMENTS PREPARED FROM SCOTT CRUDE KAOLIN

| | | | Filter Cake | | | |
|---|---|---|---|---|---|---|
| % Calgon 261 LV added to Filter Feed | Particle Size of Fractionated Clay | Dispersant 0.025% wt. | 62% Solids Brookfield Viscosity @ 20 rpm (cps) | 62% Solids Hercules endpoint Viscosity "A" Bob | 60% Solids Black Glass Scatter | |
| | | | | | 457 nm | 577 nm |
| 0.03 | 83% - 2 um | TSPP | 57 | 2.0/1100 | 0.153 | 0.106 |
| | | C-211 | 48 | 2.0/1100 | 0.148 | 0.102 |
| 0.06 | 83% - 2 um | TSPP | 42 | 2.8/1100 | 0.163 | 0.113 |
| | | C-211 | 35 | 1.6/1100 | 0.147 | 0.102 |
| 0.08 | 83% - 2 um | C-211 | 55 | 920/16 | 0.182 | 0.130 |
| 0.15 | 83% - 2 um | C-211 | 3325 | *200/16 | 0.187 | 0.148 |
| 0.06 | 90% - 2 um | TSPP | 83 | 13.4/1100 | 0.198 | 0.143 |
| | | C-211 | 100 | 6.9/1100 | 0.193 | 0.143 |
| 0.08 | 90% - 2 um | TSPP | 132.5 | *16/460 | 0.206 | 0.150 |
| | | C-211 | 65 | 16/880 | 0.195 | 0.146 |
| 0.13 | 90% - 2 um | TSPP | 77.5 | 16/560 | 0.200 | 0.150 |
| | | C-211 | 135.0 | *16/410 | 0.200 | 0.147 |
| 0.03 | 79% - 2 um | TSPP | 66.5 | 4.3/1100 | 0.159 | 0.112 |
| | | C-211 | 56.0 | 4.2/1100 | 0.159 | 0.107 |
| 0.06 | 79% - 2 um | TSPP | 127 | 15/1100 | 0.177 | 0.132 |
| | | C-211 | 55 | 9.1/1100 | 0.175 | 0.126 |
| 0.08 | 79% - 2 um | TSPP | 83.5 | 16*/520 | 0.186 | 0.141 |
| | | C-211 | 57.5 | 16/1100 | 0.180 | 0.134 |
| 0.13 | 79% - 2 um | TSPP | Gel* | (Not tested) | (Not tested) | (Not tested) |
| | | C-211 | 19 | 16*/420 | 0.181 | 0.139 |

*These viscosities are higher than desired.

TABLE XI

CLAY-WATER DISPERSION PROPERTIES OF BULKING PIGMENTS AT 62% SOLIDS

| Sample No. | 1 | 2 | 3 | 4 |
|---|---|---|---|---|
| % <2 microns | 80 | 90 | 83 | 90 |
| % Calgon 261 LV | 0.08 | 0.08 | 0.15 | 0.08 |
| % Colloid 211 | 0.025 | 0.025 | 0.05 | 0.075 |
| Shear* | Moderate | Moderate | Moderate | Moderate |
| % Solids | 62.0 | 62.0 | 62.0 | 62.0 |
| Brookfield Viscosity, 20 rpm | 60 | 60 | 55 | 400 |
| Hercules "A" 1100 rpm dyne-cm × 10⁵ | 1100/15.6 | 690/16 | 290/16 | 1100/4.7 |

*Moderate = Waring Blendor, 1 minute, 40 volt setting

We claim:

1. A method for preparing a heat stable aqueous slurry of a bulking pigment suitable for use in coating or filling paper which comprises preparing a fluid aqueous suspension of particles of kaolin clay, adding thereto a water-soluble cationic polyelectrolyte, the amount of said cationic polyelectrolyte being sufficient to substantially thicken and flocculate said fluid suspension, acidifying the resulting flocculated clay suspension, bleaching the clay in said suspension with a hydrosulfite salt, filtering said acidified suspension to recover bulked clay, washing the filtered clay and adding minimal amounts of a sodium polyacrylate and a nonionic surfactant to the recovered bulked clay to provide a fluid suspension of bulked clay.

2. The method of claim 1 wherein said nonionic surfactant is compatible with water and oil and has an HLB value in the range of 3 to 18.

3. The method as claimed in claim 1 wherein said surfactant has an HLB value in the range of 5 to 14.

4. The method as claimed in claim 1 wherein said surfactant is present in an effective amount up to 0.3 wt.% of the weight of said clay.

5. The method as claimed in claim 1 wherein said surfactant is present in an effective amount of up to 0.15% wt. of the total weight of said clay.

6. The product as claimed in claim 1 wherein said surfactant is decyloxy poly (ethyleneoxy) ethanol having the general formula:

$$C_{10}H_{21}O(C_2H_4O)nCH_2CH_2OH$$

wherein n is an integer of 6 to 8.

7. The method as claimed in claim 1 wherein said surfactant is decyloxypoly (ethyleneoxy) ethanol having the general formula:
$$C_{10}H_{21}O(C_2H_4O)nCH_2CH_2OH$$

wherein n is an integer of 6 to 8.

8. The product of claim 1 wherein such surfactant is nonylphenoxypoly (ethyleneoxy) ethanol.

9. The method as claimed in claim 1 wherein said surfactant is nonylphenoxypoly (ethyleneoxy) ethanol.

10. A method for preparing a heat stable aqueous slurry of a bulking pigment suitable for use in coating or filling paper which comprises preparing a fluid aqueous suspension of particles of kaolin clay, adding thereto a water-soluble cationic polyelectrolyte, the amount of said cationic polyelectrolyte being sufficient to substantially thicken and flocculate said fluid suspension, acidifying the resulting flocculated clay suspension, filtering said acidified suspension to recover bulked clay, washing the filtered clay and adding minimal amounts of a sodium polyacrylate and a nonionic surfactant to the recovered bulked clay to provide a fluid suspension of bulked clay.

11. The method of claim 10 wherein said nonionic surfactant is comptible with water and oil and has an HLB value in the range of 3 to 18.

12. The method as claimed in claim 10 wherein said surfactant has an HLB value in the range of 5 to 14.

13. The method as claimed in claim 10 wherein said surfactant is present in an effective amount up to 0.3 wt.% of the weight said clay.

14. The method as claimed in claim 10 wherein said surfactant is present in an effective amount of up to 0.15% wt. of the total weight of said clay.

15. The product as claimed in claim 10 wherein said surfactant is decyloxy poly (ethyeneoxy) ethanol having the general formula:

$$C_{10}H_{21}O(C_2H_4O)nCH_2CH_2OH$$

wherein n is an integer of 6 to 8.

* * * * *